(12) United States Patent
Somers

(10) Patent No.: US 8,941,601 B2
(45) Date of Patent: Jan. 27, 2015

(54) APPARATUS AND ASSOCIATED METHODS

(75) Inventor: Jonathan Somers, Tucker, GA (US)

(73) Assignee: Nokia Corporation, Espoo (FI)

( * ) Notice: Subject to any disclaimer, the term of this patent is extended or adjusted under 35 U.S.C. 154(b) by 421 days.

(21) Appl. No.: 13/091,711

(22) Filed: Apr. 21, 2011

(65) Prior Publication Data

US 2012/0268391 A1 Oct. 25, 2012

(51) Int. Cl.
*G09G 5/00* (2006.01)
*G06F 3/0488* (2013.01)
*G06F 1/16* (2006.01)
*H04M 1/725* (2006.01)

(52) U.S. Cl.
CPC .......... *G06F 3/04886* (2013.01); *G06F 1/1694* (2013.01); *H04M 1/72552* (2013.01); *H04M 2250/12* (2013.01); *H04M 2250/22* (2013.01); *H04M 2250/70* (2013.01)
USPC ........... 345/173; 345/156; 345/168; 345/169; 455/556.1; 455/556.2; 455/566; 715/773

(58) Field of Classification Search
USPC ........ 345/156.157, 159, 169, 173; 455/556.1, 455/556.2, 566; 715/773
See application file for complete search history.

(56) References Cited

U.S. PATENT DOCUMENTS

| | | | | |
|---|---|---|---|---|
| 6,501,464 | B1 * | 12/2002 | Cobbley et al. | 345/173 |
| 6,567,101 | B1 * | 5/2003 | Thomas | 345/649 |
| 6,731,227 | B2 * | 5/2004 | Horie | 341/22 |
| 7,002,553 | B2 * | 2/2006 | Shkolnikov | 345/169 |
| 8,019,390 | B2 * | 9/2011 | Sindhu | 455/566 |
| 2003/0038821 | A1 | 2/2003 | Kraft | |
| 2005/0275633 | A1 | 12/2005 | Varanda | |
| 2009/0225035 | A1 | 9/2009 | Baik | |
| 2009/0315831 | A1 | 12/2009 | Gray | |
| 2010/0088625 | A1 | 4/2010 | Chen | |
| 2010/0323762 | A1 | 12/2010 | Sindhu | |

FOREIGN PATENT DOCUMENTS

| | | |
|---|---|---|
| EP | 1 607 847 A1 | 12/2005 |
| JP | 2007-183787 A | 7/2007 |
| JP | 2008-102810 A | 5/2008 |
| WO | WO 01/43473 A1 | 6/2001 |

OTHER PUBLICATIONS

International Search Report and Written Opinion for Application No. PCT/FI2012/050373 dated Sep. 19, 2012.

(Continued)

*Primary Examiner* — Jennifer Nguyen
(74) *Attorney, Agent, or Firm* — Alston & Bird LLP

(57) ABSTRACT

An apparatus comprising at least one processor and at least one memory including computer program code, the at least one memory and the computer program code configured to, with the at least one processor, cause the apparatus at least to: detect an angle of tilt of a device comprising a touch-sensitive display, the touch-sensitive display configured to provide visual content associated with an application and a virtual keyboard for inputting characters in connection with the application, wherein the virtual keyboard is provided on top of the visual content; and adjust the opacity of the virtual keyboard according to the angle of tilt such that the underlying visual content is visible to a greater or lesser extent.

20 Claims, 8 Drawing Sheets

(56) References Cited

OTHER PUBLICATIONS

"SmartQ MID Unofficial Board—View Topic—On-screen keyboard transparency" [online] [retrieved May 26, 2011]. Retrieved from the Internet: <http://www.smartqmid.com/phpBB3/viewtopic.php?f=2& t=78>. 1 page.

Astrid Widget Transparency—Android Forums [online] [retrieved May 31, 2011]. Retrieved from the Internet: <URL: http://androidforums.com/android-applications/54919-astrid-widget-transparency.html>. 3 pages.

Transparency/Translucency working on emulator but not device—Android Developers . . . [online] [retrieved May 31, 2011]. Retrieved from the Internet: <URL: http://groups.google.com/group/android-developments/browse_thread/thread/aae1797bd . . . >, 3 pages.

* cited by examiner

APPARATUS AND ASSOCIATED METHODS

TECHNICAL FIELD

The present disclosure relates to the field of virtual keyboards, associated methods and apparatus, and in particular concerns adjusting the opacity of a virtual keyboard according to the angle of tilt of an apparatus such that a user of the apparatus is able to see underlying visual content to a greater or lesser extent. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Many modern electronic devices incorporate a display screen for presenting visual content associated with a running application, and a keyboard for inputting characters in connection with the application. The keyboard may be distinct from the display (e.g. a physical keyboard), or may be integrated within the display itself (e.g. a virtual keyboard). The incorporation of a virtual keyboard does not necessarily need to impact on the overall device dimensions and therefore facilitates device miniaturisation. As a result, virtual keyboards are becoming increasingly more common. A disadvantage of virtual keyboards, however, is that they take up a considerable amount of on-screen space during use, leaving less room to display the visual content of the underlying application.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising at least one processor and at least one memory including computer program code, the at least one memory and the computer program code configured to, with the at least one processor, cause the apparatus at least to:
 detect an angle of tilt of a device comprising a touch-sensitive display, the touch-sensitive display configured to provide visual content associated with an application and a virtual keyboard for inputting characters in connection with the application, wherein the virtual keyboard is provided on top of the visual content; and
 adjust the opacity of the virtual keyboard according to the angle of tilt such that the underlying visual content is visible to a greater or lesser extent.

The touch-sensitive display may be configured to provide the virtual keyboard upon instruction by a user of the device. The apparatus may be configured to set the opacity of the virtual keyboard to an initial value when the virtual keyboard is first provided in response to said instruction, regardless of the angle of tilt at the moment of instruction.

The apparatus may be configured to adjust the opacity of the virtual keyboard within a predetermined range of opacity values. The predetermined range of opacity values may comprise a minimum value. The minimum value may provide that the virtual keyboard still remains visible at all angles of tilt. The minimum value may provide that the virtual keyboard is at least as visible as the underlying visual content at all angles of tilt.

The apparatus may be configured to adjust the opacity of the entire virtual keyboard. The apparatus may be configured to adjust the opacity of part of the virtual keyboard.

The virtual keyboard may comprise a plurality of keys separated by gaps. One or more of the keys may comprise a keycap and a key legend. One or more of the keycaps may comprise a keycap body and a visible keycap boundary/border. The apparatus may be configured to adjust the opacity of one or more of the keycaps and key legends according to the angle of tilt whilst keeping one or more of the gaps between the keys transparent. The apparatus may be configured to adjust the opacity of one or more of the keycap boundaries and key legends according to the angle of tilt whilst keeping one or more of the keycap bodies and the gaps between the keys transparent.

The apparatus may be configured to adjust the opacity of one or more parts of the virtual keyboard. The apparatus may be configured to enable a user of the device to select the particular parts of the virtual keyboard of which the opacity can be adjusted.

The apparatus may be configured to allow the level of opacity associated with each angle of tilt to be assigned by a user of the device.

The apparatus may be configured to adjust the opacity of the virtual keyboard in one or more of a continuous and discrete stepwise manner as the angle of tilt is continuously varied.

The apparatus may be configured to adjust the opacity of the virtual keyboard as the device is tilted about the horizontal axis of the touch-sensitive display, the vertical axis of the touch-sensitive display, or any axis which lies parallel to the plane of the touch-sensitive display. The apparatus may be configured to adjust the opacity of the virtual keyboard as the device is tilted about the axis in a clockwise (i.e. a first sense of rotation) or anti-clockwise direction (i.e. the opposite sense of rotation).

In some embodiments, the apparatus may be configured to receive character input regardless of the opacity of the virtual keyboard. In other embodiments, however, the apparatus may be configured to receive character input only when the virtual keyboard is visible.

The apparatus and/or device may comprise a tilt sensor. The tilt sensor may be configured to detect the angle of tilt of the device.

According to a further aspect, there is provided a device comprising any apparatus described herein.

The device may be one or more of the following: an electronic device, a portable electronic device, a portable telecommunications device, a smartphone, a tablet computer, a touch-sensitive display for any of the aforementioned devices, and a module for any of the aforementioned devices.

According to a further aspect, there is provided a method comprising:

detecting an angle of tilt of a device comprising a touch-sensitive display, the touch-sensitive display configured to provide visual content associated with an application and a virtual keyboard for inputting characters in connection with the application, wherein the virtual keyboard is provided on top of the visual content; and adjusting the opacity of the virtual keyboard according to the angle of tilt such that the underlying visual content is visible to a greater or lesser extent.

The steps of any method disclosed herein do not have to be performed in the exact order disclosed, unless explicitly stated or understood by the skilled person.

According to a further aspect, there is provided a non-transitory computer-readable memory medium storing a computer program, the computer program comprising computer code configured to perform any method described herein.

The apparatus may comprise one or more processors or memories configured to provide the functionality described herein. It will therefore be appreciated that any reference herein to a processor or memory may be considered to be a reference to at least one processor or memory, respectively.

The apparatus may comprise a processor configured to process the code of the computer program. The processor may be a microprocessor, including an Application Specific Integrated Circuit (ASIC).

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC ASPECTS/EMBODIMENTS

As mentioned in the background section, a disadvantage of virtual keyboards is that they take up a considerable amount of on-screen space during use, leaving less room to display the visual content of the underlying application. This has proven to be particularly troublesome when the underlying application is a social networking application or website, for example, and the virtual keyboard is required for entering comments on a conversation thread.

Figure 1A:
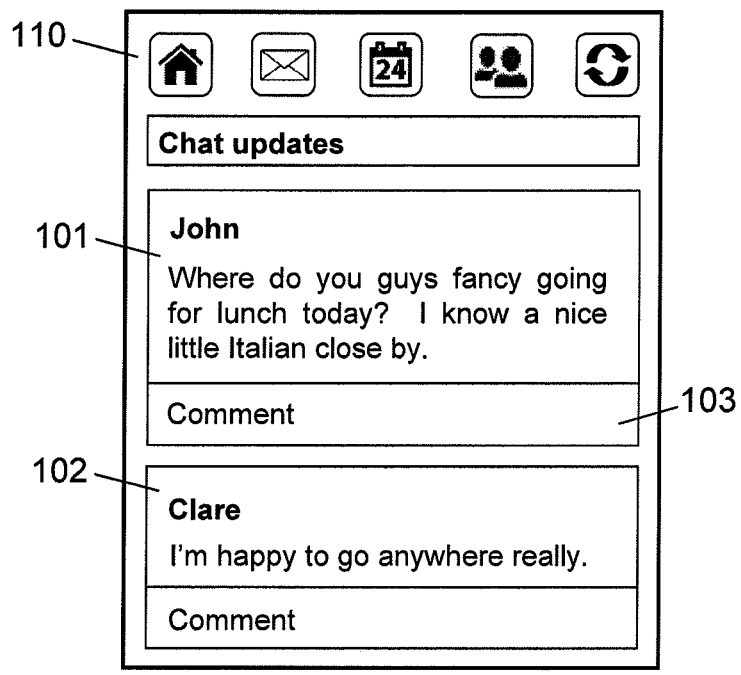
FIG. 1a shows a screenshot of a social networking application.
Figure 1B:
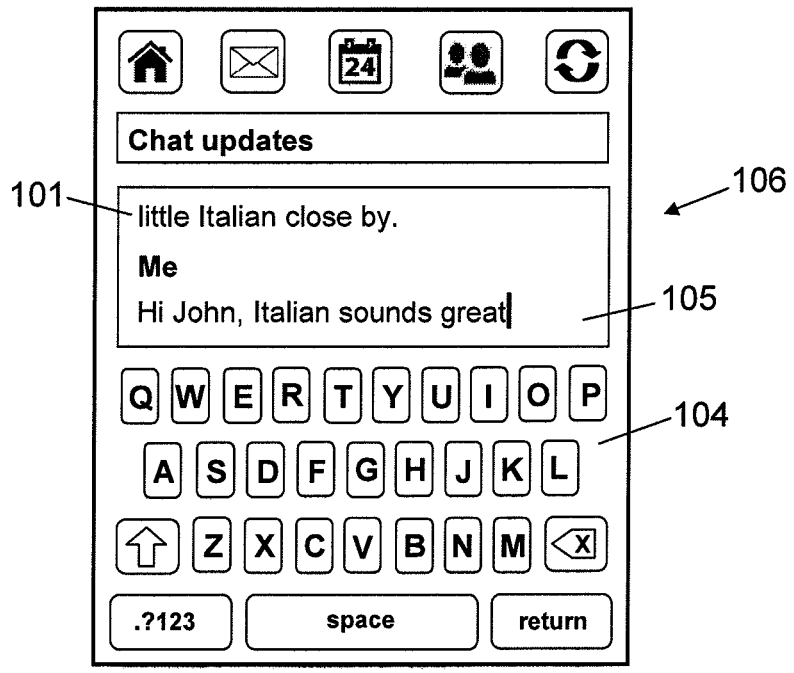
FIG. 1b shows the screenshot of FIG. 1a as a user comments on a friend's status update using a virtual keyboard.

Many current devices have attempted to address this issue by automatically adjusting the vertical and horizontal positions of the visual content so that the text entry region is centred within the remaining visible area (as illustrated in FIGS. 1a and 1b).

FIG. 1a shows a screenshot of a social networking application 110 after a user has logged on to his/her account to browse the most recent updates. Two of the recent updates include comments 101, 102 from previously added contacts, "John" and "Clare". In this example, the user has decided to reply to John's comment 101, and has touched the corresponding "Comments" box 103 to call the virtual keyboard 104. On doing this, the virtual keyboard 104 has appeared at the bottom of the screen, and a text entry region 105 is provided below John's comment 101 awaiting character input (as shown in FIG. 1b). In order to accommodate the virtual keyboard 104, however, the device has shifted John's comment 101 upwards on the display. The user is now unable to see this comment 101 in its entirety. Therefore, if the user wishes to see John's comment 101 to remind himself/herself of what was previously said, he/she must stop typing and scroll up until the comment 101 is visible again. This is inconvenient.

A further disadvantage associated with automatically positioning the text entry region 105 in the centre of the remaining visible area 106, is that the text entry region 105 is sometimes larger than the remaining visible area 106 (either in the horizontal dimension, the vertical dimension, or both). In this situation, the text entry region 105 must be continually moved as the user types, otherwise the user in unable to read what he/she has written.

Figure 2A:
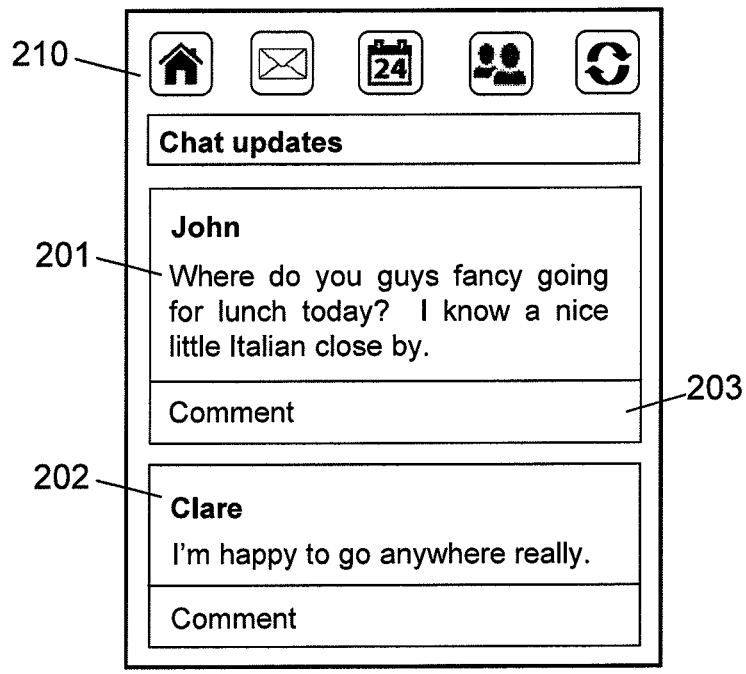
FIG. 2a shows a screenshot of a social networking application.
Figure 2B:
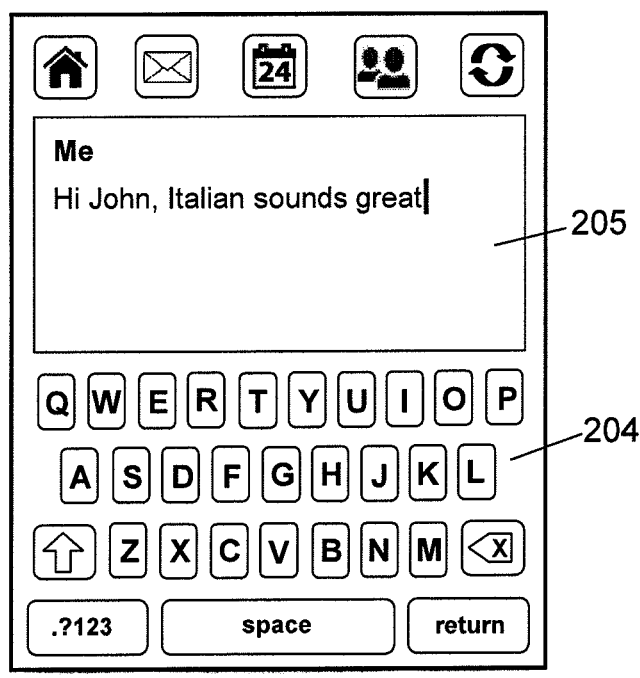
FIG. 2b shows the screenshot of FIG. 2a as a user comments on a friend's status update using a virtual keyboard.

Some devices have tried to sidestep this problem by taking the user out of the application and displaying the text entry region 205 in a dedicated window (shown in FIG. 2b). Whilst this approach may improve the readability of the text being input, it prevents the user from being able to see the previous comment 201 to which he/she is responding. The solutions incorporated in current devices are therefore inadequate.

There will now be described an apparatus/device and method which may or may not address these issues. It should be noted, however, that the term "apparatus" as used throughout the specification may be taken to encompass one or more components of a device, a module for a device, or a device itself.

The apparatus (which will be described in detail later with reference to FIG. 8) comprises a touch-sensitive display, which is configured to provide visual content associated with an application, and a virtual keyboard for inputting characters in connection with the application. As with the devices described above, the virtual keyboard is provided on top of (i.e. overlaid on) the visual content. Unlike the device described above, however, the present apparatus is configured to detect an angle of tilt, and adjust the opacity of the virtual keyboard according to the angle of tilt such that the underlying visual content is visible to a greater or lesser extent.

Figure 3A:
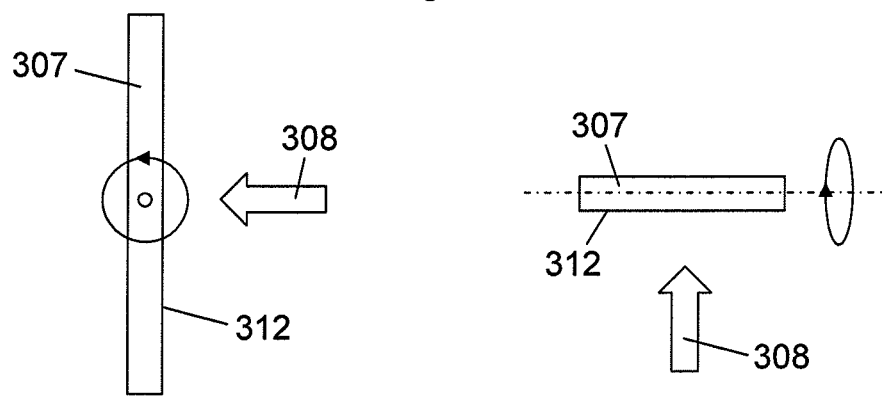
FIG. 3a shows an apparatus comprising a touch-sensitive display and a virtual keyboard at a first angle of tilt.
Figure 3B:
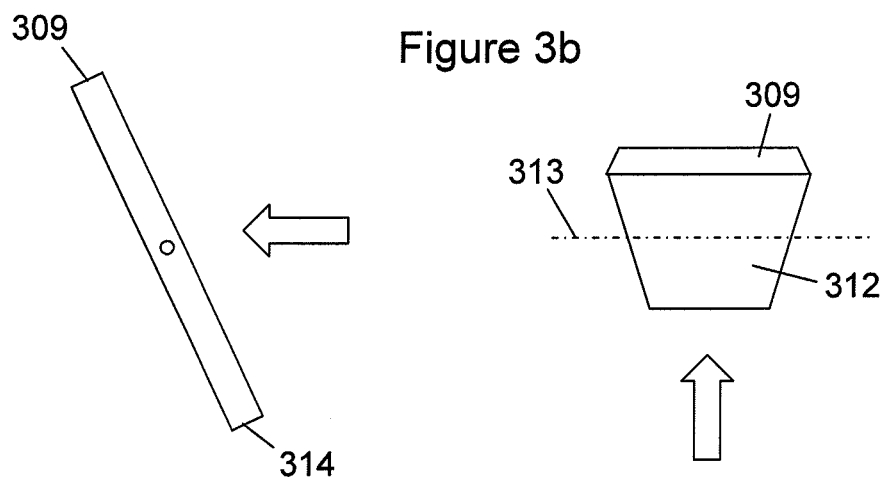
FIG. 3b shows the apparatus of FIG. 3a at a second angle of tilt.
Figure 3C:
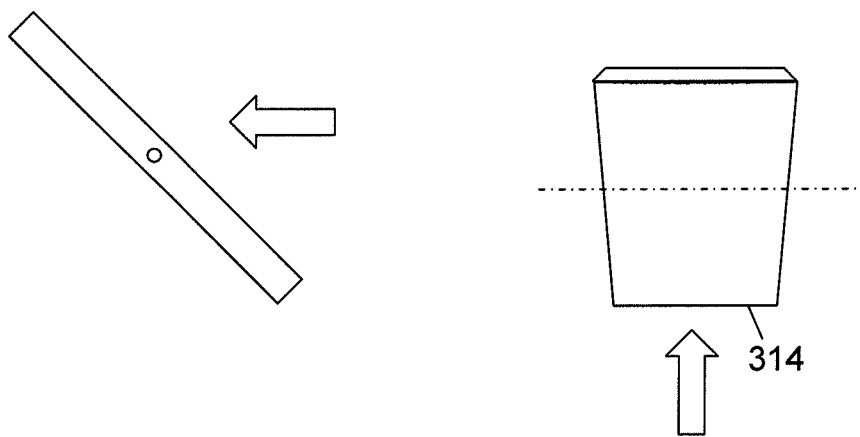
FIG. 3c shows the apparatus of FIG. 3a at a third angle of tilt.
Figure 4A:
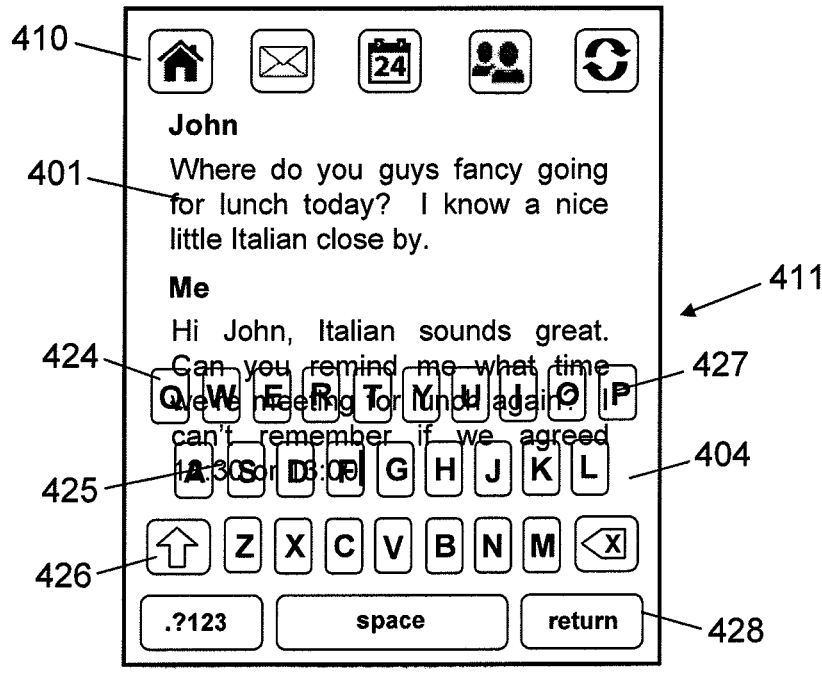
FIG. 4a shows the virtual keyboard of the apparatus of FIG. 3a at the first angle of tilt.
Figure 4B:
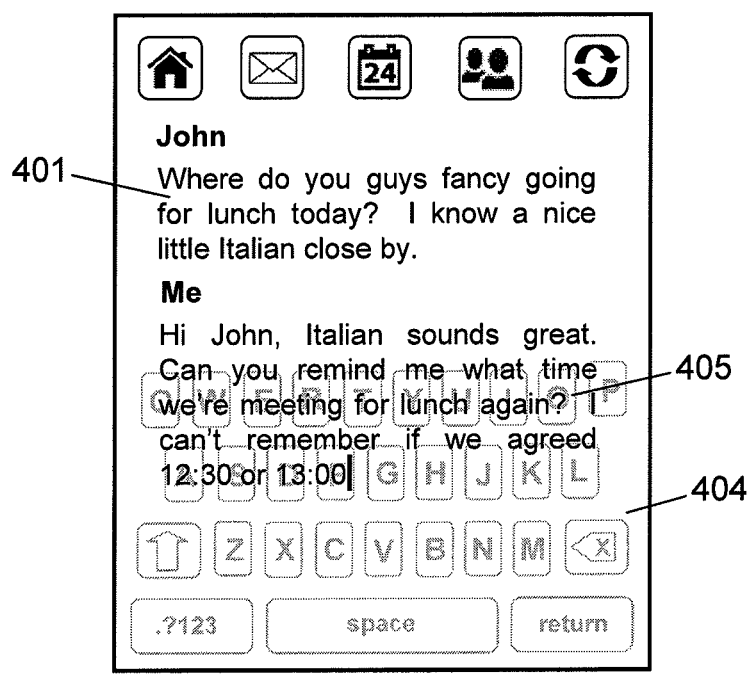
FIG. 4b shows the virtual keyboard of the apparatus of FIG. 3a at the second angle of tilt.
Figure 4C:
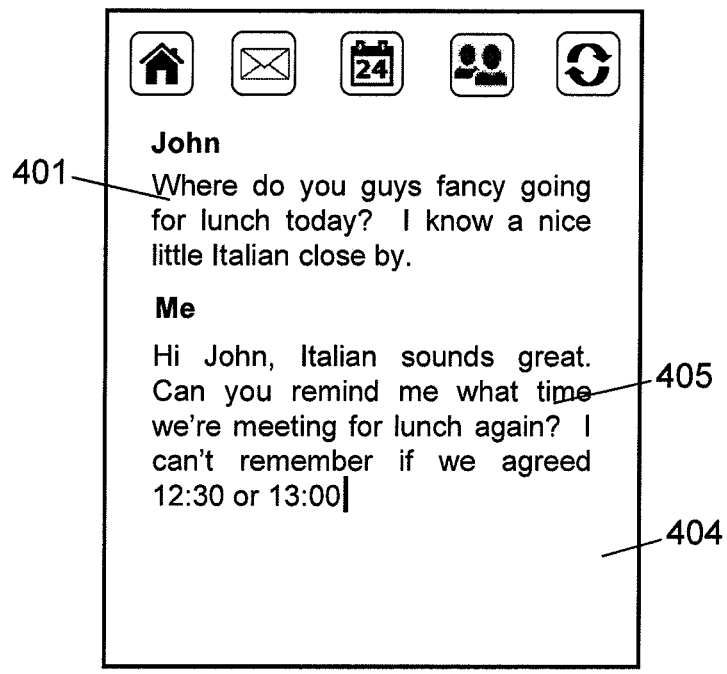
FIG. 4c shows the virtual keyboard of the apparatus of FIG. 3a at the third angle of tilt.

Using the social networking application as an example again, FIGS. 3a-3c show the apparatus 307 at different angles of tilt, whilst FIGS. 4a-4c show corresponding screenshots of the application 410 (with the virtual keyboard 404). In this example, the application 410 has a similar layout to that shown in FIG. 1a. In FIGS. 3a-3c, the diagrams on the left of the page depict the apparatus 307 from the side, whilst the diagrams on the right of the page depict the apparatus 307 from above. Furthermore, the arrows 308 pointing towards the apparatus illustrate the direction of the user's gaze.

Before the apparatus 307 is tilted (FIG. 3a), the opacity of the virtual keyboard 404 is set to an initial value (FIG. 4a). As the user tilts the apparatus 307, the top side 309 of the apparatus 307 moves further from the user (FIG. 3b), and the opacity of the virtual keyboard 404 decreases (FIG. 4b). Furthermore, as the user tilts the apparatus 307, the virtual keyboard (when located towards the bottom of the display) is brought closer to the user. At the new angle of tilt, the user is able to see the underlying visual content 411 as well as the virtual keyboard 404. As the user tilts the apparatus 307 further (FIG. 3c), the opacity of the virtual keyboard 404 continues to decrease until the virtual keyboard 404 is no longer visible to the user (FIG. 4c). At this angle, the user is only able to see the visual content 411. The present apparatus 307 therefore allows the user to see visual content 411 located beneath the virtual keyboard 404 simply by tilting the apparatus 307. In this way, the space taken up by the virtual keyboard 404 becomes less of an issue.

In some embodiments, the apparatus 307 is configured to receive character input via the virtual keyboard only when the virtual keyboard is visible. In this respect, the apparatus may be conveniently re-tilted to a position in which the virtual keyboard is visible again in order to allow for character input.

In the example illustrated in FIGS. 4a-4c, the text entry region 405 is positioned below the previous comment 401. As a result, the text being input by the user can be at least partly hidden by the virtual keyboard 404 (FIGS. 4a and 4b), whilst the previous comment 401 can be visible to the user at all angles of tilt. This may not be the most optimum configuration, as the user may be required to tilt the apparatus 307 in order to check the characters as they are being input. Furthermore, if the user tilts the apparatus 307 too far, the virtual keyboard 404 will disappear, and the user may be unable to locate the correct keys (or the apparatus may be unable to receive character input at all). In another embodiment (not shown), the position of the text entry region 405 and the previous comment 401 are reversed such that the text entry region 405 is located above the previous comment 401, and the virtual keyboard 404 is placed in front of (i.e. overlying) the previous comment 401. Since the text entry region 405 is not visually inhibited by an overlaid virtual keyboard, the user can tilt the apparatus 307 to review the underlying previous comment 401, whilst still being able to see the inputted text at all (or various) angles of tilt.

In FIG. 3a, the user's gaze 308 is perpendicular to the plane 312 of the touch-sensitive display. However, different users may prefer to hold the apparatus 307 at different positions during use. As a result, the viewing angle will likely vary from one user to the next. Furthermore, the viewing angle may vary depending on the user's posture (e.g. standing vs sitting), the location of ambient light sources (which can cause undesirable glare on the screen), the particular application being run on the apparatus 307 (which can dictate whether the apparatus 307 is held in portrait or landscape mode), and so on.

As a consequence of the different possible viewing angles, it may not be advantageous to fix the tilt angle corresponding to the initial opacity. To address this issue, the present apparatus may be configured to provide the virtual keyboard upon instruction by a user of the apparatus, and set the opacity of the virtual keyboard to an initial value when the virtual keyboard first appears in response to said instruction, regardless of the angle of tilt at that particular moment.

The initial opacity may be a maximum opacity. In this scenario, the opacity of the virtual keyboard would decrease as the apparatus is tilted relative to the angle of the apparatus at the moment when the virtual keyboard appeared on the display (i.e. the initial angle). The opacity of the virtual keyboard would then increase to the maximum value as the angle of the apparatus returned to the initial angle. In other embodiments, the initial opacity may be an intermediate (e.g. mid-point) opacity between the maximum and minimum opacity values which the apparatus can provide.

The apparatus may be configured to adjust the opacity of the virtual keyboard within a predetermined range of values comprising a maximum and minimum value. The maximum and minimum values may range from 0% to 100% opacity, provided that the maximum value is always greater than the minimum value. However, it may be undesirable to have a completely transparent keyboard (shown in FIG. 4c), as this would make it difficult for a user to locate the correct keys. A completely transparent keyboard (in those embodiments where a transparent virtual keyboard would still accept character input) may also cause a user to forget that the virtual keyboard is still being presented and attempt to interact with the visual content behind the keyboard (which may result in incorrect/unwanted character inputs). To address this issue, the minimum value may be chosen such that the virtual keyboard remains visible at all angles of tilt. In particular, the minimum value may be chosen such that the virtual keyboard is at least as visible as the underlying visual content at all angles of tilt.

In some embodiments, the apparatus may be configured to adjust the opacity of the virtual keyboard in a continuous manner as the angle of tilt is continuously varied, whilst in other embodiments, the apparatus may be configured to adjust the opacity of the virtual keyboard in a stepwise manner as the angle of tilt is continuously varied. Whether the apparatus adopts a continuous or stepwise change in opacity may depend on the amount of memory and/or processing power available to the apparatus. This is because a continuous change in opacity may require a greater number of possible opacity values, and therefore involve a greater number of adjustments to the display settings.

Different users of the apparatus may have different user preferences for the level of opacity at different angles of tilt, the range of possible opacity values, and also whether the opacity should be varied in a continuous or stepwise manner. For example, some users may prefer the opacity to vary slowly with tilt angle, whilst other users may prefer the opacity to vary more quickly with tilt angle. In this respect, the apparatus may be configured such that one or more of these settings can be assigned and/or adjusted by a user of the apparatus. The apparatus may also be configured such that one or more of these settings can be assigned and/or adjusted by a manufacturer of the apparatus.

Figure 5:
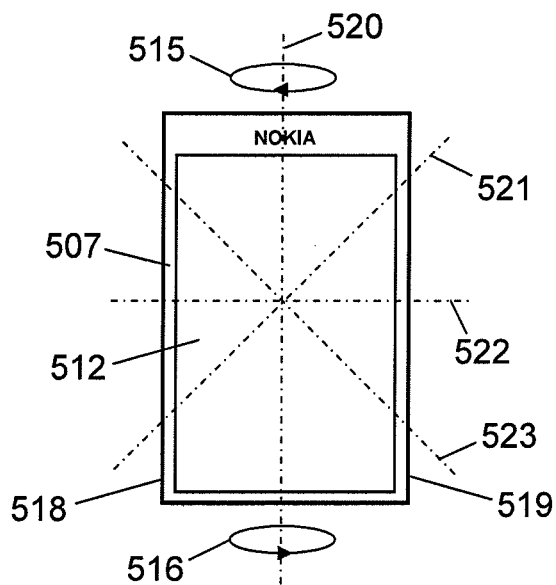
FIG. 5 shows different tilt axes lying parallel to the plane of the touch-sensitive display.

Whilst FIGS. 3a-3c show the apparatus being tilted about an axis 313 which is parallel to the top 309 and bottom 314 sides of the apparatus 307, this is not the only possible axis about which the apparatus 307 can be tilted to adjust the opacity of the virtual keyboard. As illustrated in FIG. 5, the apparatus 507 may be configured to adjust the opacity of the virtual keyboard as the apparatus is tilted about any axis 520-523 which lies parallel to the plane 512 of the touch-sensitive display.

Furthermore, whilst the left hand diagrams in FIGS. 3a-3c show the apparatus 307 being tilted in an anti-clockwise direction about the tilt axis 313 (i.e. the top side 309 of the apparatus is moved further from the user), the apparatus 307 may also be tilted in a clockwise direction (i.e. the top side 309 of the apparatus being moved closer to the user) to cause a change in opacity. This applies not only to the tilt axis 313 illustrated in FIGS. 3a-3c, but to any axis about which the apparatus 307 is tilted. This is illustrated by the arrows 515, 516 in FIG. 5, where the apparatus 507 can be seen to rotate about an axis 520 parallel to its long sides 518, 519. In addition, the opacity of the virtual keyboard may deviate from the initial opacity value as the apparatus is rotated away from the initial angle in either direction.

As shown in FIGS. 4a-4c, the virtual keyboard 404 comprises a plurality of keys 424 separated by gaps 425. Each key 424 of the virtual keyboard 404 comprises a keycap (the area of the key 424 which the user must touch in order to perform the functionality associated with that key 424) and a key legend 427 (which identifies the functionality associated with the key 424). The keycaps may or may not comprise a user-visible boundary/border 428 around the keycap body 426.

In some embodiments, the apparatus may be configured to adjust the opacity of the entire virtual keyboard 404 (i.e. the opacity of the keycap bodies 426, the keycap boundaries 428, the key legends 427, and also the gaps 425 between the keys 424), but this is not the only option. In other embodiments, however, the apparatus may be configured to adjust the opacity of one or more of the keycap bodies 426, the keycap boundaries 428, the key legends 427, and the gaps 425 between the keys.

Figure 6A:
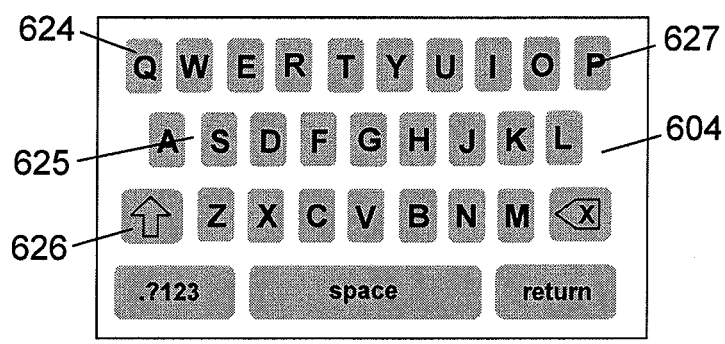
FIG. 6a shows one virtual keyboard at a first angle of tilt.
Figure 6B:
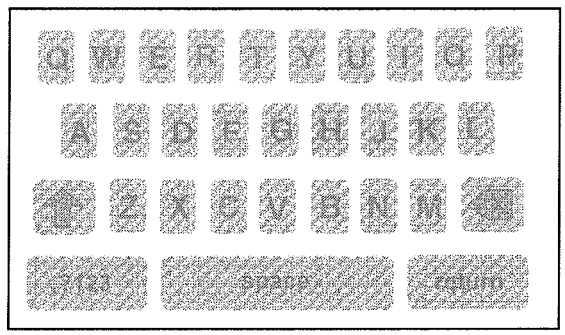
FIG. 6b shows the keyboard of FIG. 6a at a second angle of tilt.

FIGS. 6a-6b illustrate such an embodiment. In this embodiment, the keycaps do not comprise a boundary around the keycap body 626, and the gaps 625 between the keys 624 are transparent at all angles of tilt. When the apparatus is tilted, the opacity of the keycap bodies 626 and the key legends 627 are varied.

Figure 7A:
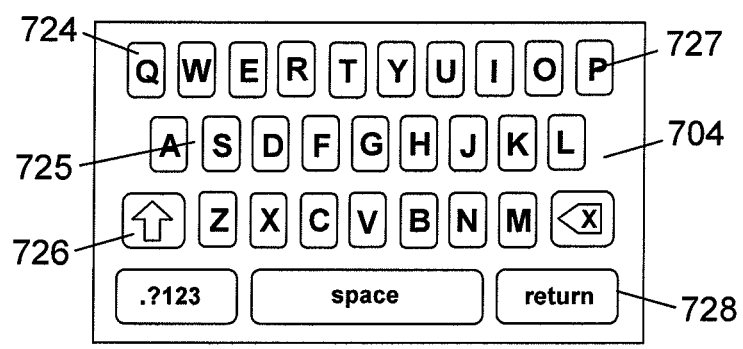
FIG. 7a shows another virtual keyboard at a first angle of tilt.
Figure 7B:
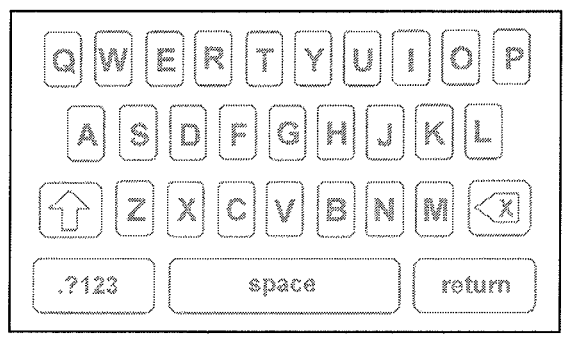
FIG. 7b shows the keyboard of FIG. 7a at a second angle of tilt.

FIGS. 7a-7b illustrate another embodiment. This time, the keycap bodies 726 and the gaps 725 between the keys 724 are transparent at all angles of tilt, but the keycaps comprise a boundary 728 around the keycap body 726. In this embodiment, the opacity of the keycap boundaries 728 and the key legends 727 are varied when the apparatus it tilted.

In another embodiment (not shown), the apparatus may be configured to adjust the opacity of a particular area/region of the virtual keyboard with tilt angle. In this embodiment, the apparatus may be configured to adjust the opacity of one or more of the keycap bodies, the keycap boundaries, the key legends, and the gaps between the keys within that particular area/region. Furthermore, the particular area/region within which the opacity is varied may depend on the direction of tilt. For example, if the apparatus is tilted clockwise 515 about axis 520 (see FIG. 5), the opacity of the left half of the virtual keyboard may be varied. Likewise, if the apparatus is tilted anti-clockwise 516 about axis 520, the opacity of the right half of the virtual keyboard may be varied. This embodiment may be useful when only some of the visual content is obscured by the virtual keyboard.

It will be appreciated, however, that there are a number of different possible keyboard configurations, and the present invention is not limited specifically to those illustrated in FIGS. 6a-6b, and 7a-7b. Furthermore, the apparatus may be configured to enable a user of the apparatus to select the parts of the virtual keyboard of which the opacity is varied with tilt angle. This allows the user to configure the virtual keyboard to suit his/her personal preferences.

Any settings which are configurable by the user may be adjusted using an on-screen control panel (not shown). Furthermore, such settings may be individually adjusted, or may be adjusted together as part of a larger "theme" or stylesheet that can be applied to the apparatus as a whole (e.g. along with wallpapers, widget colours, and so on).

Whilst the above description has been focussed exclusively on a change in opacity with tilt angle, the apparatus could additionally or alternatively be configured to vary one or more other visual aspects of the virtual keyboard and/or underlying visual content with tilt angle (not illustrated). For example, in one embodiment, the apparatus may be configured to vary the sharpness of the keyboard and/or the sharpness of the underlying visual content. In another embodiment, the apparatus may be configured to vary the colour of the keyboard and/or the colour of the underlying visual content. In yet another embodiment, the apparatus may be configured to vary the contrast of the keyboard and/or the contrast of the underlying visual content.

Although none of these changes necessarily affect the amount of on-screen space taken up by the virtual keyboard during use, they can be used to draw the user's attention towards or away from the virtual keyboard and/or underlying visual content. For example, if the sharpness of the keyboard is initially greater than the sharpness of the underlying content (i.e. the underlying content is blurred), then the user's eyes are drawn to the keyboard. If the sharpness of the keyboard and underlying visual content are then decreased and increased, respectively, as the user tilts the apparatus, the user's eyes are drawn from the keyboard to the underlying visual content.

A similar effect may be achieved if the colour of the keyboard is intensified and the underlying visual content reduced to greyscale as the tilt angle is varied in one direction. Tilting of the apparatus in the opposite direction would then cause the keyboard to be greyed out and the underlying visual content restored to its natural colours.

In another embodiment, the apparatus may additionally or alternatively be configured to adjust the on-screen placement of the virtual keyboard according to the angle of tilt. For example, tilting of the apparatus about axis 522 in FIG. 5 could shift the virtual keyboard in a direction perpendicular to this axis in the plane 512 of the display (i.e. up or down). Similarly, tilting of the apparatus about axis 520 in FIG. 5 could shift the virtual keyboard in a direction perpendicular to this axis in the plane of the display (i.e. left or right). The same could be true for any of the other tilt axes. Again, this embodiment would not necessarily affect the amount of on-screen space taken up by the virtual keyboard (unless of course the virtual keyboard could be moved partially or completely out of the display by tilting the apparatus), but it would enable a user of the apparatus to see the underlying visual content to a greater or lesser extent.

Therefore, tilting of the apparatus may be used to vary the appearance of the virtual keyboard and visual content in one or more ways. In this respect, the apparatus and/or computer program described herein may be configured to apply one or more of these effects at any one time.

Figure 8:
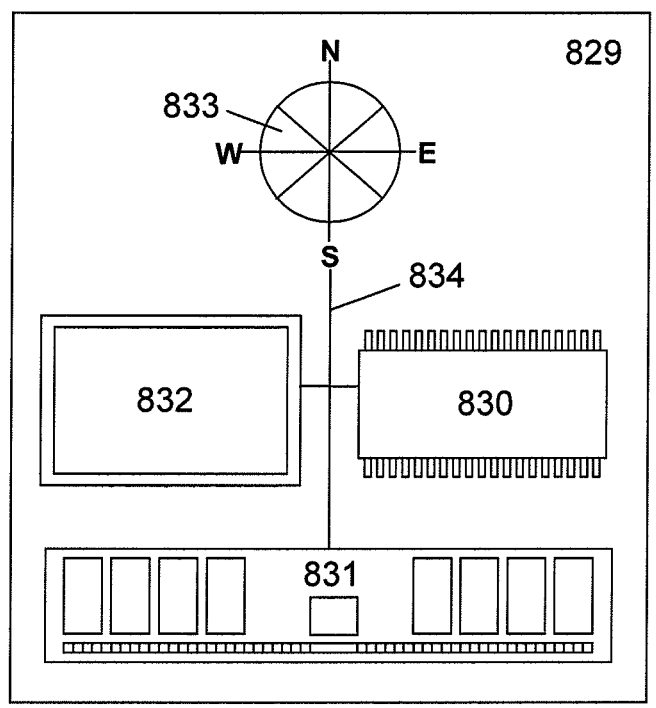
FIG. 8 shows a device comprising the apparatus described herein.

Greater detail of the apparatus 829 will now be provided with reference to FIG. 8. The apparatus 829 comprises a processor 830, a storage medium 831, a touch-sensitive display 832, and a tilt sensor 833, which are electrically connected to one another by a data bus 834. The apparatus 829 may be an electronic device, a portable electronic device, a portable telecommunications device, a smartphone, a tablet computer, or a module for any of the aforementioned devices.

The processor 830 is configured for general operation of the apparatus 829 by providing signalling to, and receiving signalling from, the other device components to manage their operation. In particular, the processor 830 is configured to adjust the opacity of the virtual keyboard according to the angle of tilt such that the underlying visual content is visible to a greater or lesser extent. The processor 830 may be a microprocessor, including an Application Specific Integrated Circuit (ASIC).

The storage medium 831 is configured to store computer code configured to perform, control or enable operation of the apparatus 829, as described with reference to FIG. 10. The storage medium 831 may also be configured to store one or more applications (with which the visual content is associated), and the opacity values for different angles of tilt. Furthermore, the storage medium 831 may be configured to store settings for the other device components. When the storage medium 831 is used to store settings for the other device components, the processor 830 may access the storage medium 831 to retrieve the settings in order to manage operation of the other device components.

In addition, the storage medium 831 may be configured to store a graphical user interface which enables a user to control the functionality of the apparatus 829. In particular, the graphical user interface may enable the user to set/adjust any user-configurable device settings via an on-screen control panel.

The storage medium 831 may be a temporary storage medium such as a volatile random access memory. On the other hand, the storage medium 831 may be a permanent storage medium such as a hard disk drive, a flash memory, or a non-volatile random access memory.

The touch-sensitive display 832 is configured to provide visual content associated with an application, and a virtual keyboard for inputting characters in connection with the application (on top of the visual content). The characters input using the touch-sensitive display 832 are presented on a text entry region of the display 832.

The touch-sensitive display 832 may also be configured to display the graphical user interface, and may comprise additional touch-screen keys for navigation of the user interface. Furthermore, the touch-sensitive display 832 may be an LED (light-emitting diode), LCD (liquid crystal display) or plasma display, and may comprise one or more of the following touchscreen technologies: resistive, side acoustic wave, capacitive, force panel, optical imaging, dispersive signal, acoustic pulse recognition, and bidirectional screen technology. The touch-sensitive display 832 may be configured to detect physical contact with any part of the user's body (not just the user's fingers), and may be configured to detect physical contact with a stylus.

The touch-screen keys may be arranged to form a 12-key alphanumeric keypad, a portrait "qwerty" keyboard, or a landscape "qwerty" keyboard. The touch-screen keys may be configured to allow input of numbers, punctuation marks, and/or letters of the Roman, Greek, Arabic and/or Cyrillic alphabets. The touch-screen keys may be configured to allow the input of text in one or more of the following languages: English, Chinese, Japanese, Greek, Arabic, Indo-European, Oriental and Asiatic. The touch-sensitive display 832 may be configured to enable input of Chinese or Japanese characters, either directly or via transcription methods such as Pinyin and/or Bopomofo (Zhuyin Fuhao).

The tilt sensor 833 is configured to detect (and monitor) the angle of tilt of the apparatus 829, and provide this information to the processor 830 so that the processor 830 can adjust the opacity of the virtual keyboard accordingly. In some embodiments, the tilt sensor 833 may be configured to begin detecting/monitoring the tilt angle automatically as soon as the virtual keyboard appears on the touch-sensitive display 832. In other embodiments, the tilt sensor 833 may need to be switched on or activated by a user of the apparatus 829 before it can begin detecting/monitoring the tilt angle. The tilt sensor 833 may comprise an accelerometer, a gyroscope, or any other technology suitable for detecting the angle of tilt.

Figure 9:
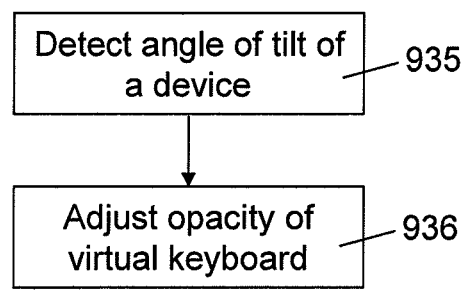
FIG. 9 shows the key steps of the method described herein.

The main steps 935-936 of the method described herein are illustrated schematically in FIG. 9.

Figure 10:
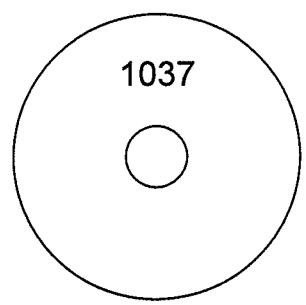
FIG. 10 shows a computer readable medium providing a computer program for carrying out the method described herein.

FIG. 10 illustrates schematically a non-transitory computer/processor readable medium 1037 providing a computer program according to one embodiment. In this example, the computer/processor readable medium 1037 is a disc such as a digital versatile disc (DVD) or a compact disc (CD). In other embodiments, the computer/processor readable medium 1037 may be any medium that has been programmed in such a way as to carry out an inventive function. The computer/processor readable medium 1037 may be a removable memory device such as a memory stick or memory card (SD, mini SD or micro SD).

The computer program may comprise computer code configured to perform, control or enable one or both of the following method steps: detecting an angle of tilt of a device comprising a touch-sensitive display, the touch-sensitive display configured to provide visual content associated with an application and a virtual keyboard for inputting characters in connection with the application, wherein the virtual keyboard is provided on top of the visual content; and adjusting the opacity of the virtual keyboard according to the angle of tilt such that the underlying visual content is visible to a greater or lesser extent.

The computer program could be provided as a downloadable application (or "app"), and installed on any device comprising the components illustrated in FIG. 8.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical side to secure wooden parts together, whereas a screw employs a helical side, in the environment of fastening wooden parts, a nail and a screw may be equivalent structures.

The invention claimed is:

1. An apparatus comprising at least one processor and at least one memory including computer program code, the at least one memory and the computer program code configured to, with the at least one processor, cause the apparatus at least to:
detect an angle of tilt of a device comprising a touch-sensitive display, the touch-sensitive display configured to provide visual content associated with an application and a virtual keyboard for inputting characters in connection with the application, wherein the virtual keyboard is provided on top of the visual content; and
while the virtual keyboard is and remains active and visible upon the touch-sensitive display, adjust the opacity of the virtual keyboard according to the angle of tilt such that the underlying visual content is visible to a greater or lesser extent, wherein the virtual keyboard comprises a plurality of virtual keys associated with respective characters that remain unchanged as the angle of tilt is varied and the opacity of the virtual keyboard is correspondingly adjusted in a continuous or stepwise manner in response to the angle of tilt.

2. The apparatus of claim 1, wherein the touch-sensitive display is configured to provide the virtual keyboard upon instruction by a user of the device, and wherein the apparatus is configured to set the opacity of the virtual keyboard to an initial value when the virtual keyboard is first provided in response to said instruction, regardless of the angle of tilt at the moment of instruction.

3. The apparatus of claim 1, wherein the apparatus is configured to adjust the opacity of the virtual keyboard within a predetermined range of opacity values.

4. The apparatus of claim 3, wherein the predetermined range of opacity values comprises a minimum value, the minimum value providing that the virtual keyboard still remains visible at all angles of tilt.

5. The apparatus of claim 3, wherein the predetermined range of opacity values comprises a minimum value, the minimum value providing that the virtual keyboard is at least as visible as the underlying visual content at all angles of tilt.

6. The apparatus of claim 1, wherein the apparatus is configured to adjust the opacity of the entire virtual keyboard.

7. The apparatus of claim 1, wherein the apparatus is configured to adjust the opacity of part of the virtual keyboard.

8. The apparatus of claim 1, wherein the apparatus is configured to adjust the opacity of one or more of the keycaps and key legends of a virtual keyboard, the virtual keyboard comprising a plurality of keys separated by gaps, according to the angle of tilt whilst keeping the gaps between the keys transparent.

9. The apparatus of claim 1, wherein the apparatus is configured to adjust the opacity of one or more of the keycap boundaries and key legends of a virtual keyboard, the virtual keyboard comprising a plurality of keys separated by gaps, according to the angle of tilt whilst keeping the keycap bodies and the gaps between the keys transparent.

10. The apparatus of claim 1, wherein the apparatus is configured to allow the level of opacity associated with each angle of tilt to be assigned by a user of the device.

11. The apparatus of claim 1, wherein the apparatus is configured to enable a user of the device to select the particular parts of the virtual keyboard of which the opacity can be adjusted.

12. The apparatus of claim 1, wherein the apparatus is configured to adjust the opacity of the virtual keyboard in one or more of a continuous and discrete stepwise manner as the angle of tilt is continuously varied.

13. The apparatus of claim 1, wherein the apparatus is configured to adjust the opacity of the virtual keyboard as the device is tilted about an axis which lies parallel to the plane of the touch-sensitive display.

14. The apparatus of claim 13, wherein the apparatus is configured to adjust the opacity of the virtual keyboard as the device is tilted about the axis in a clockwise or anti-clockwise direction.

15. The apparatus of claim 1, wherein the apparatus is configured to be able to receive character input from a visible virtual keyboard.

16. The apparatus of claim 1, wherein the apparatus comprises a tilt sensor, and wherein the tilt sensor is configured to detect the angle of tilt of the device.

17. A device comprising the apparatus of claim 1.

18. The device of claim 17, wherein the device is one or more of the following: an electronic device, a portable electronic device, a portable telecommunications device, a smartphone, a tablet computer, a touch-sensitive display for any of the aforementioned devices, and a module for any of the aforementioned devices.

19. A method comprising:
    detecting an angle of tilt of a device comprising a touch-sensitive display, the touch-sensitive display configured to provide visual content associated with an application and a virtual keyboard for inputting characters in connection with the application, wherein the virtual keyboard is provided on top of the visual content; and
    while the virtual keyboard is and remains active and visible up the touch-sensitive display, adjusting the opacity of the virtual keyboard according to the angle of tilt such that the underlying visual content is visible to a greater or lesser extent, wherein the virtual keyboard comprises a plurality of virtual keys associated with respective characters that remain unchanged as the angle of tilt is varied and the opacity of the virtual keyboard is corresponding adjusted in a continuous or stepwise manner in response to the angle of tilt.

20. A non-transitory computer-readable memory medium storing a computer program, the computer program comprising computer code configured to perform the method of claim 19.

* * * * *

UNITED STATES PATENT AND TRADEMARK OFFICE
CERTIFICATE OF CORRECTION

| | |
|---|---|
| PATENT NO. | : 8,941,601 B2 |
| APPLICATION NO. | : 13/091711 |
| DATED | : January 27, 2015 |
| INVENTOR(S) | : Somers |

Page 1 of 1

It is certified that error appears in the above-identified patent and that said Letters Patent is hereby corrected as shown below:

In the claims:

Column 14,
Lines 19 and 20, "visible up" should read --visible upon--.

Signed and Sealed this
Fifteenth Day of September, 2015

Michelle K. Lee
*Director of the United States Patent and Trademark Office*